(12) United States Patent
Gold

(10) Patent No.: US 10,221,488 B2
(45) Date of Patent: Mar. 5, 2019

(54) SUPERCRITICAL WATER METHOD FOR TREATING INTERNAL PASSAGES

(71) Applicant: General Electric Company, Schenectady, NY (US)

(72) Inventor: Scott Alan Gold, Waynesville, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/858,616

(22) Filed: Sep. 18, 2015

(65) Prior Publication Data
US 2017/0081768 A1   Mar. 23, 2017

(51) Int. Cl.
| C23F 1/14 | (2006.01) |
| B08B 7/00 | (2006.01) |
| B08B 9/027 | (2006.01) |
| B08B 9/032 | (2006.01) |

(52) U.S. Cl.
CPC ............. *C23F 1/14* (2013.01); *B08B 7/0021* (2013.01); *B08B 9/027* (2013.01); *B08B 9/0321* (2013.01)

(58) Field of Classification Search
None
See application file for complete search history.

(56) References Cited

U.S. PATENT DOCUMENTS

| 4,260,336 A | | 4/1981 | Johnson | |
| 4,792,408 A | | 12/1988 | Titmas | |
| 5,427,764 A | * | 6/1995 | Barber | B01J 3/008 |
| | | | | 210/512.1 |
| 5,501,799 A | * | 3/1996 | Bond | C02F 11/086 |
| | | | | 210/721 |
| 5,529,637 A | * | 6/1996 | Frenier | C11D 3/2075 |
| | | | | 134/10 |
| 5,560,823 A | * | 10/1996 | Whiting | B01J 3/008 |
| | | | | 210/175 |
| 5,571,423 A | * | 11/1996 | Daman | B01J 3/008 |
| | | | | 210/761 |
| 5,582,715 A | * | 12/1996 | McBrayer, Jr. | B01J 3/008 |
| | | | | 210/143 |
| 5,620,606 A | * | 4/1997 | McBrayer, Jr. | C02F 11/086 |
| | | | | 210/143 |
| 5,643,474 A | | 7/1997 | Sangeeta | |
| 5,674,405 A | * | 10/1997 | Bourhis | C02F 1/025 |
| | | | | 210/761 |

(Continued)

FOREIGN PATENT DOCUMENTS

| CA | 2 955 068 A1 | 2/2015 |
| CN | 1551296 A | 12/2004 |

(Continued)

OTHER PUBLICATIONS

Peter Kritzer, Corrosion in high-temperature and supercritical water and aqueous solutions: a review, J. of Supercritical Fluids 2004, 1-29, 29, Elsevier B.V.

(Continued)

*Primary Examiner* — Allan Olsen
(74) *Attorney, Agent, or Firm* — General Electric Company; Kristi Davidson

(57) ABSTRACT

A method of reducing surface roughness in an internal passage of a workpiece includes contacting the internal passage with a corrosive working fluid comprising water at or near supercritical conditions.

19 Claims, 4 Drawing Sheets

(56) References Cited

U.S. PATENT DOCUMENTS

| | | | |
|---|---|---|---|
| 5,685,917 A * | 11/1997 | Sangeeta | C23G 1/14 134/19 |
| 5,770,174 A * | 6/1998 | Eller | B01J 3/008 210/199 |
| 5,932,182 A * | 8/1999 | Blaney | B01J 3/008 203/16 |
| 6,001,243 A * | 12/1999 | Eller | B01J 3/00 210/105 |
| 6,123,984 A * | 9/2000 | Fumio | C23C 18/1619 216/13 |
| 6,149,828 A | 11/2000 | Vaartstra | |
| 6,526,115 B2 | 2/2003 | Kataoka et al. | |
| 6,613,157 B2 | 9/2003 | DeYoung et al. | |
| 6,848,458 B1 | 2/2005 | Shrinivasan et al. | |
| 6,920,917 B2 | 7/2005 | Inoue et al. | |
| 6,958,122 B1 * | 10/2005 | Gidner | B01F 5/045 210/761 |
| 8,790,585 B2 * | 7/2014 | Wang | C02F 1/725 210/205 |
| 2001/0022206 A1 * | 9/2001 | Furuya | B01J 3/008 148/284 |
| 2002/0014257 A1 | 2/2002 | Chandra et al. | |
| 2004/0175948 A1 | 9/2004 | DeSimone et al. | |
| 2004/0232072 A1 | 11/2004 | Arai et al. | |
| 2005/0199263 A1 | 9/2005 | Irie et al. | |
| 2005/0261150 A1 | 11/2005 | Yonker et al. | |
| 2007/0160524 A1 * | 7/2007 | Yoshida | B01J 3/008 423/580.1 |
| 2008/0073292 A1 * | 3/2008 | Stenmark | B01J 3/008 210/758 |
| 2009/0003124 A1 * | 1/2009 | Kondoh | B01J 3/008 366/102 |
| 2009/0226351 A1 * | 9/2009 | Rosenberg | C02F 11/086 423/1 |
| 2010/0184301 A1 | 7/2010 | Wagner et al. | |
| 2013/0126442 A1 | 5/2013 | Bakas et al. | |
| 2013/0206374 A1 | 8/2013 | Roisin et al. | |
| 2014/0318748 A1 | 10/2014 | Svensson et al. | |
| 2015/0118090 A1 * | 4/2015 | Lachey | F04C 23/008 418/55.5 |
| 2016/0010003 A1 * | 1/2016 | Walters | C10G 31/08 585/16 |
| 2016/0075957 A1 * | 3/2016 | Cooke | C10J 3/78 422/162 |
| 2016/0167986 A1 * | 6/2016 | Millar | C02F 1/485 210/695 |
| 2016/0194569 A1 * | 7/2016 | Graf | C23F 15/00 423/648.1 |

FOREIGN PATENT DOCUMENTS

| | | |
|---|---|---|
| EP | 1106946 A2 | 6/2001 |
| EP | 2202009 A1 | 6/2010 |
| FR | 2686351 A1 | 7/1993 |
| FR | 2815559 A1 | 4/2002 |
| JP | 2000280262 A | 10/2000 |
| JP | 2001-214287 A | 8/2001 |
| JP | 2003-031533 A | 1/2003 |
| JP | 2003-181272 A | 7/2003 |
| JP | 2004-105947 A | 4/2004 |
| JP | 2007-145656 A | 6/2007 |

OTHER PUBLICATIONS

European Search Report and Opinion issued in connection with corresponding EP Application No. 16189251.8 dated Mar. 1, 2017.
Karasek, P., et al., "Etching of glass microchips with supercritical water," Royal Society of Chemistry, vol. 15, pp. 311-318 (Oct. 24, 2014).
Machine Translation and Notification of Reasons for Refusal issued in connection with corresponding JP Application No. 2016-179073 dated Nov. 7, 2017.
Office Action issued in connection with corresponding CA Application No. 2941820 dated Aug. 28, 2017.
Machine Translation and First Office Action and Search issued in connection with corresponding CN Application No. 201610822562.3 dated Jan. 19, 2018.

* cited by examiner

SUPERCRITICAL WATER METHOD FOR TREATING INTERNAL PASSAGES

BACKGROUND OF THE INVENTION

The present invention relates to manufacturing methods, and more particularly, to methods for reducing surface roughness in internal passages of workpieces.

In manufacturing processes, there is a desire to reduce surface roughness in small internal channels of components. This is especially true for parts with complex internal geometries, for example components or assemblies made by casting or by additive manufacturing processes.

Various methods of reducing surface roughness are known such as mechanical polishing, electrochemical polishing, chemical passivation, and chemical polishing using strong acids. While all these methods are effective, each has disadvantages.

For example, mechanical polishing becomes difficult as internal passage dimensions shrink, and can produce uneven results around curves and other internal features due to variation in the flow field especially in "dead zones" of the flow field. Electrochemical polishing requires insertion of an electrode near the surface to be polished, which is not feasible on complex internal geometries. Chemical polishing using strong acids presents significant environmental, health, and safety challenges.

Accordingly, there remains a need for a method of reducing surface roughness in internal passages.

BRIEF DESCRIPTION OF THE INVENTION

This need is addressed by a method using near critical or supercritical water solutions to clean internal passages.

BRIEF DESCRIPTION OF THE DRAWINGS

The invention may be best understood by reference to the following description, taken in conjunction with the accompanying drawing figures in which.

DETAILED DESCRIPTION OF THE INVENTION

Figure 1:
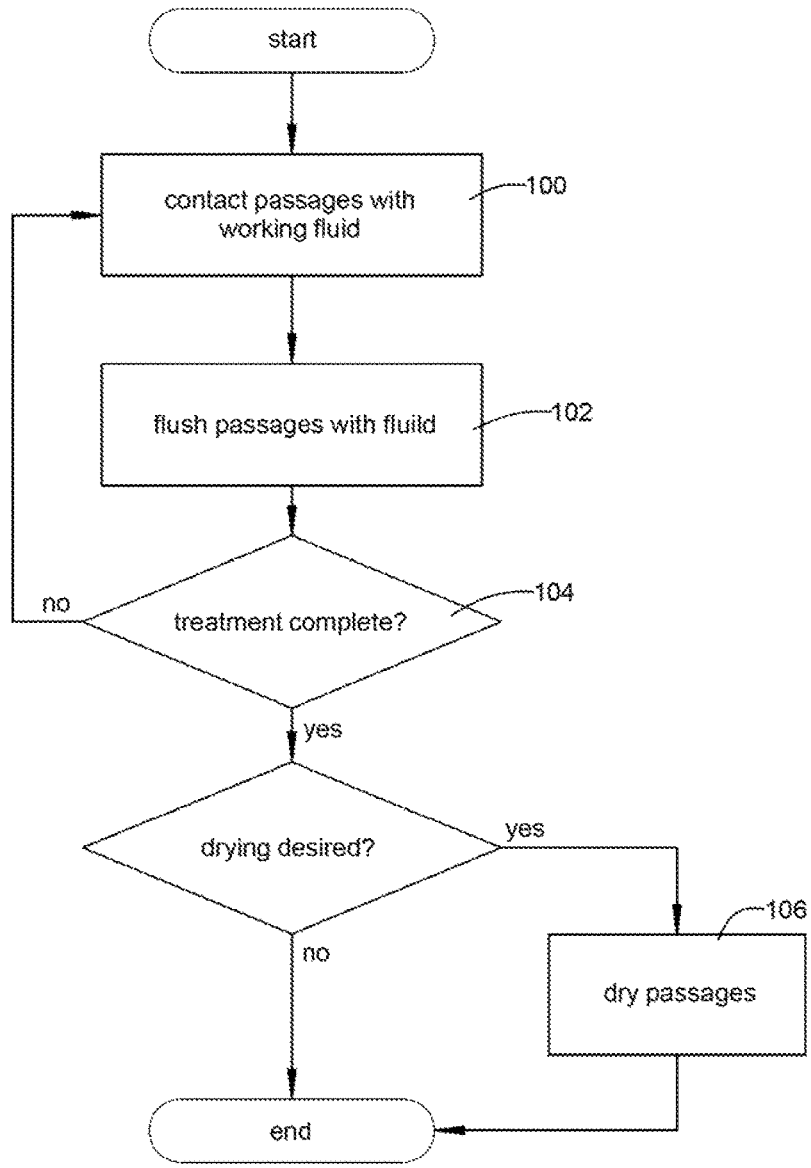
FIG. 1 is a flow chart illustrating a water-based chemical polishing method.

Referring to the drawings wherein identical reference numerals denote the same elements throughout the various views, FIG. 1 is a flowchart illustrating generally a method for treating internal passages of a workpiece. The method described herein is suitable for treating internal passages in many types of workpieces. In a first step, block 100, internal passages are contacted with working fluid comprising water at or near supercritical conditions, optionally with one or more cosolvents.

In water, the critical point occurs at about 374° C. (705° F.) and 22.064 MPa (3.2 KSIA). Water is highly corrosive to metals at conditions approaching the critical point (i.e. "near supercritical" conditions) and above the critical point (i.e. "supercritical" conditions). The properties of water start changing substantially at about 10% below the critical point, i.e. pressures of about 19 to 20 MPa (2.8 to 2.9 KSIA) and above and temperatures of about 325 to 350° C. (617 to 662° F.) and above. Without being limited to specific pressures or temperatures, one of ordinary skill in the art would understand that water exhibits a distinct, substantial increase in corrosive properties under conditions in which it is still technically a gas or liquid, and not a supercritical fluid. As used herein, the term "near supercritical" refers to water with such highly corrosive properties.

The physical state and/or composition of the working fluid may be varied to suit a particular application, with the most effective conditions being alloy dependent. For example, nickel is known to dissolve most rapidly slightly below the critical point and in more acidic conditions. Chromium on the other hand appears to be more soluble above the critical point and under alkaline conditions. Cosolvents may be added as needed to achieve a particular acidic or alkaline condition. Nonlimiting examples of suitable cosolvents include: mineral acids, organic acids, organic bases, inorganic bases, and salts.

The corrosive nature of the working fluid leads to dissolution of surface asperities, reducing the surface roughness of the internal passages. This process may be referred to herein as "chemical polishing".

Subsequently, block 102, the internal passages are flushed or rinsed to stop the chemical polishing process and remove dissolved metal debris. Rinsing may be carried out, for example, by using a separate non-corrosive rinsing fluid. Alternatively, the working fluid may be transitioned to subcritical conditions so as to be non-corrosive, and then used as a rinsing fluid.

The passages may be examined to determine if treatment is complete (block 104) and the steps of polishing followed by rinsing may be repeated as necessary to achieve a desired surface finish.

Optionally, the internal passages may be dried (block 106), for example by forced heated air circulation.

Figure 2:
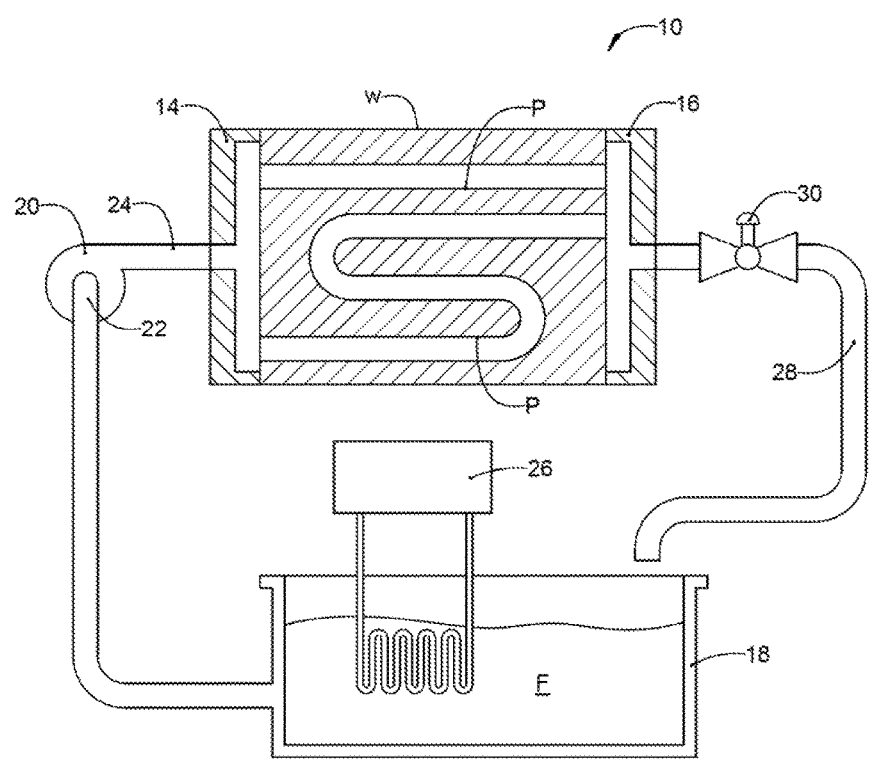
FIG. 2 is a schematic diagram of an apparatus for water-based chemical polishing coupled to a workpiece.

FIG. 2 shows schematically an example of apparatus 10 that may be used to carry out the method described above, coupled to a workpiece "W" having one or more internal passages "P". The example workpiece W shown in FIG. 2 includes an upper passage which is essentially straight as well as a lower passage containing multiple bends.

The process described herein is suitable for chemically . . . polishing internal passages in any workpiece susceptible to the corrosive action of supercritical or near-supercritical water. The process is suitable for use on workpieces made from aerospace alloys such as nickel- and cobalt-based alloys. The process may be used on the internal passages of gas turbine engine components such as airfoils and fuel nozzles. The process is especially useful for use complex components with multiple internal passages made by processes such as casting or additive manufacturing. "Additive manufacturing" is a term used herein to describe a process which involves layer-by-layer construction or additive fabrication (as opposed to material removal as with conventional machining processes). Such processes may also be referred to as "rapid manufacturing processes". Additive manufacturing processes include, but are not limited to: Direct Metal Laser Melting (DMLM), Laser Net Shape Manufacturing (LNSM), electron beam sintering, Selective Laser Sintering (SLS), 3D printing, such as by inkjets and laserjets, Sterolithography (SLA), Electron Beam Melting (EBM), Laser Engineered Net Shaping (LENS), and Direct Metal Deposition (DMD).

The workpiece W is coupled to a fixture that includes an inlet manifold 14 and an exit manifold 16. The purpose of the manifolds 14, 16, is to provide a convenient fluid flowpath between the passages P and the remainder of the apparatus 10. It will be understood that one or both of the manifolds 14, 16 could be replaced with other hardware, such as a combination of pipes and fittings.

A reservoir 18 contains a supply of working fluid "F" as described above. Alternatively, working fluid could be supplied from another source such as a building water supply pipe (not shown).

A pump 20 has an inlet 22 connected to the reservoir 18 and an outlet 24 connected to the inlet manifold 14. Collectively, the reservoir 18, pump 20, and internal passages P of the workpiece W define a fluid flow circuit.

A heating device 26 such as an electric resistance heater or heat exchanger may be provided to heat the working fluid to an appropriate temperature, at or near supercritical conditions. In this example the heating device 26 is shown immersed in the reservoir 18.

The outlet manifold 16 is connected to a drain line 28. The drain line 28 may be routed to a building drain, or a waste collection vessel, or may be routed back to the reservoir 18 for recirculation. An outflow control valve 30 is disposed in the drain line 28. The outflow control valve 30 may be operated manually or remotely.

The apparatus 10 may be used by pumping heated working fluid "F" from the reservoir 18 through the pump 20 into the internal passages P of the workpiece W. When the outflow control valve 30 is closed, fluid pressure builds until the working fluid is at or near supercritical conditions as described above. The highly corrosive working fluid leads to dissolution of surface asperities, chemically polishing the surface of the internal passages.

Subsequently the outflow control valve 30 is opened, venting working fluid and reducing its pressure to subcritical conditions. As the pump 20 continues to operate the working fluid now functions a non-corrosive rinsing fluid to flush out dissolved metal particles. The outflow control valve 30 may be opened, closed, and/or modulated as necessary to maintain a desired pressure and to cycle the working fluid between subcritical and supercritical conditions.

Figure 3:
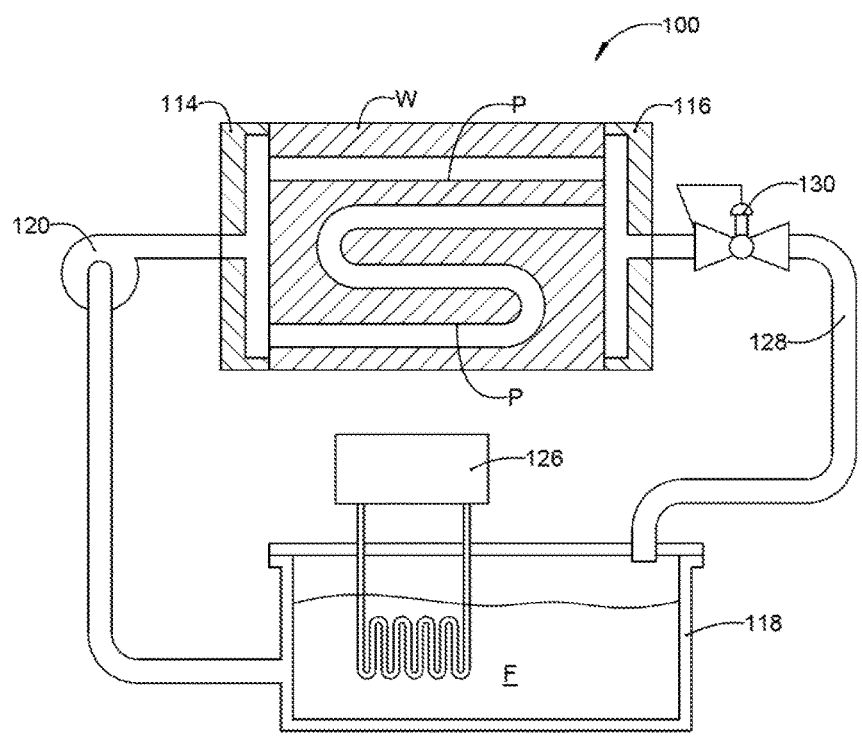
FIG. 3 is a schematic diagram of an alternative apparatus.

FIG. 3 shows schematically an alternative apparatus 110 that may be used to carry out the method described above. The apparatus includes a fluid reservoir 118, a heat exchanger 126, a pump 120, inlet and outlet manifolds 114, 116, a pressure regulating valve 130, and a return line 128.

The reservoir 118 contains a supply of working fluid F as described above and is arranged so that it can be pressurized. The apparatus 110 may be operated by running the pump 120 to circulate the working fluid F. The fluid flow loop is closed and therefore causes pressure to build, regulated by the pressure regulating valve 130 or other suitable device. The pressure regulating valve 130 may have its setpoint configured to a pressure above or near the critical point for the working fluid F.

The heat exchanger 126 may then be used to heat the working fluid F to a temperature above or near the critical point. The highly corrosive working fluid leads to dissolution of surface asperities, chemically polishing the surface of the internal passages. Subsequently, the working fluid may be cooled by natural convection or by cooling through the heat exchanger 126. As the pump 120 continues to operate the working fluid now functions a non-corrosive rinsing fluid to flush out dissolved metal particles.

Figure 4:
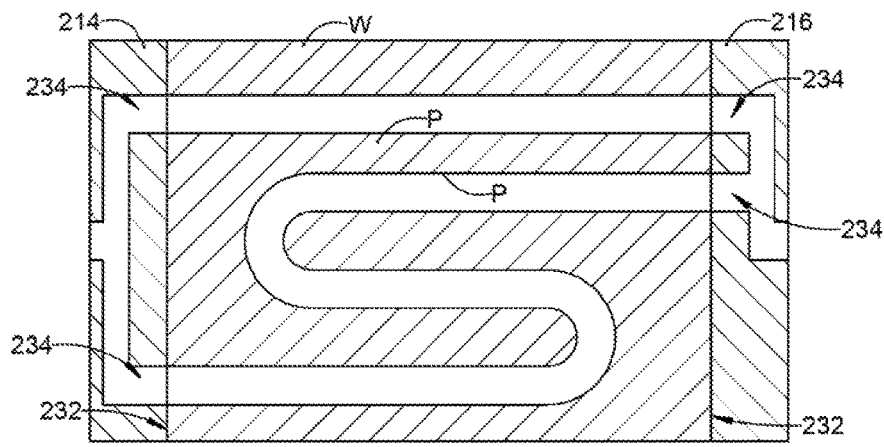
FIG. 4 is a schematic diagram of an alternative fixture.
Figure 5:
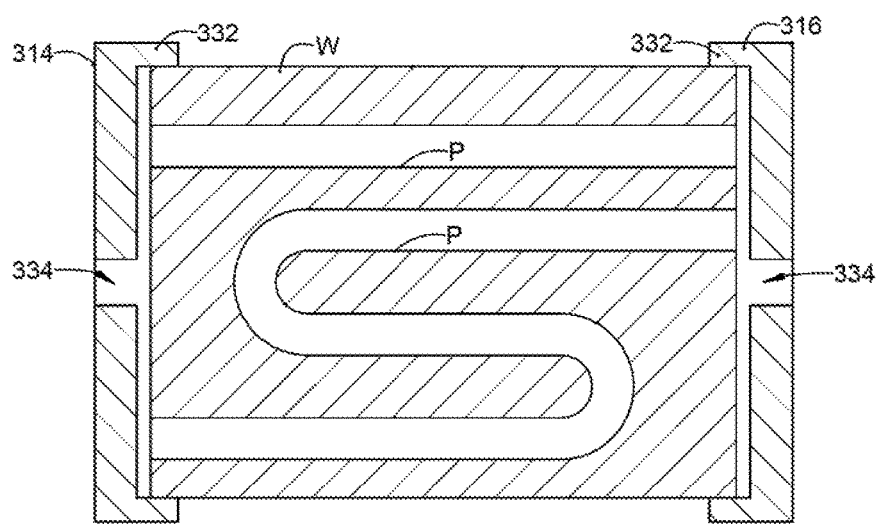
FIG. 5 is a schematic diagram of another alternative fixture.

The fixtures described above may be varied suit a particular application. For example, FIG. 4 illustrates inlet and outlet manifolds 214, 216 having flat sealing faces 232 for engaging a workpiece W, and individual ports 234 communicating with the internal passages P of the workpiece W. FIG. 5 illustrates inlet and outlet manifolds 314, 316 having peripheral sealing rims 332 for engaging a workpiece W, and open plenums 334 communicating with the internal passages P of the workpiece.

The process described above has numerous benefits for chemically polishing internal passages. Aqueous chemistry is relatively safe and environmentally friendly as well as being unlikely to leave behind any residues that might impact part performance. The pressures and temperatures required are well below the design limits of components such as fuel nozzles. It will produce consistent results even in curved passages and avoid "dead spaces". It does not required that the surfaces to be treated be near the exterior of a workpiece. This process is expected to be especially useful in removing surface roughness of surfaces in laser powder bed additive manufacturing processes.

The foregoing has described a method of reducing surface roughness using supercritical or near-supercritical water. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends any novel one, or any novel combination, of the features disclosed in this specification (including any accompanying claims, abstract and drawings), or to any novel one, or any novel combination, of the steps of any method or process so disclosed.

What is claimed is:

1. A method of removing metal surface asperities in an internal passage of a turbine engine component, comprising contacting the internal passage with a corrosive working fluid comprising water at or near supercritical conditions, wherein the working fluid is circulated through the internal passage using a pump.

2. The method of claim 1 further comprising rinsing the internal passage, subsequent to contacting the internal passage with the working fluid.

3. The method of claim 2 further comprising alternating the steps of contacting the internal passage with a corrosive working fluid comprising water at or near supercritical conditions and rinsing the internal passage.

4. The method of claim 1 wherein internal passage is rinsed by transitioning the properties of the working fluid to non-corrosive subcritical conditions.

5. The method of claim 4 further comprising alternating the steps of contacting the internal passage with a corrosive working fluid comprising water at or near supercritical conditions and rinsing the internal passage by transitioning the properties of the working fluid to non-corrosive subcritical conditions.

6. The method of claim 5 wherein the properties of the working fluid are transitioned by varying its temperature.

7. The method of claim 5 wherein the properties of the working fluid are transitioned by varying its pressure.

8. The method of claim 1 further comprising pressuring the working fluid by:
   pumping the working fluid into the internal passage while using an outflow control valve to block exit of the working fluid from the internal passage.

9. The method of claim 1 wherein the working fluid further comprises at least one cosolvent.

10. The method of claim 9 wherein the cosolvent includes at least one of: a mineral acid, an organic acid, an organic base, an inorganic base, and a salt.

11. The method of claim 1 wherein the workpiece comprises a metallic alloy comprising a nickel-based alloy, a cobalt-based alloy, or a combination thereof.

12. The method of claim 1 wherein the working fluid is at supercritical conditions.

13. The method of claim 1, wherein the turbine engine component comprises an airfoil, a fuel nozzle, or a combination thereof.

14. The method of claim 1, wherein the turbine engine component comprises an aerospace alloy.

15. A method of removing metal surface asperities in an internal passage of a turbine engine component, comprising:
   coupling an apparatus including a reservoir and a pump to the workpiece in a fluid flow circuit with the internal passage;
   using the pump to circulate a working fluid comprising water through the fluid flow circuit, wherein the working fluid is at or near supercritical conditions and is corrosive while in the internal passage of the workpiece.

16. The method of claim 15 further comprising rinsing the internal passage, by transitioning the properties of the working fluid to non-corrosive subcritical conditions while the working fluid circulates in the fluid flow circuit.

17. The method of claim 16 further comprising alternating the properties of the working fluid between corrosive supercritical or near-supercritical conditions and non-corrosive subcritical conditions, while the working fluid circulates in the fluid flow circuit.

18. The method of claim 16 wherein properties of the working fluid are transitioned by varying its temperature while the flow remains pressurized.

19. The method of claim 16 wherein the properties of the working fluid are transitioned by varying its pressure.

* * * * *